(No Model.)  8 Sheets—Sheet 2.

M. M. KOHN.
APPARATUS FOR SUPPLYING ELECTRICITY FOR LIGHT AND POWER PURPOSES.

No. 524,983.  Patented Aug. 21, 1894.

(No Model.) 8 Sheets—Sheet 3.

M. M. KOHN.
APPARATUS FOR SUPPLYING ELECTRICITY FOR LIGHT AND POWER PURPOSES.

No. 524,983. Patented Aug. 21, 1894.

Witnesses
John L. Jackson
Lettie B. Jackson

Inventor
Milton M. Kohn
By Bond & Adams
Attys.

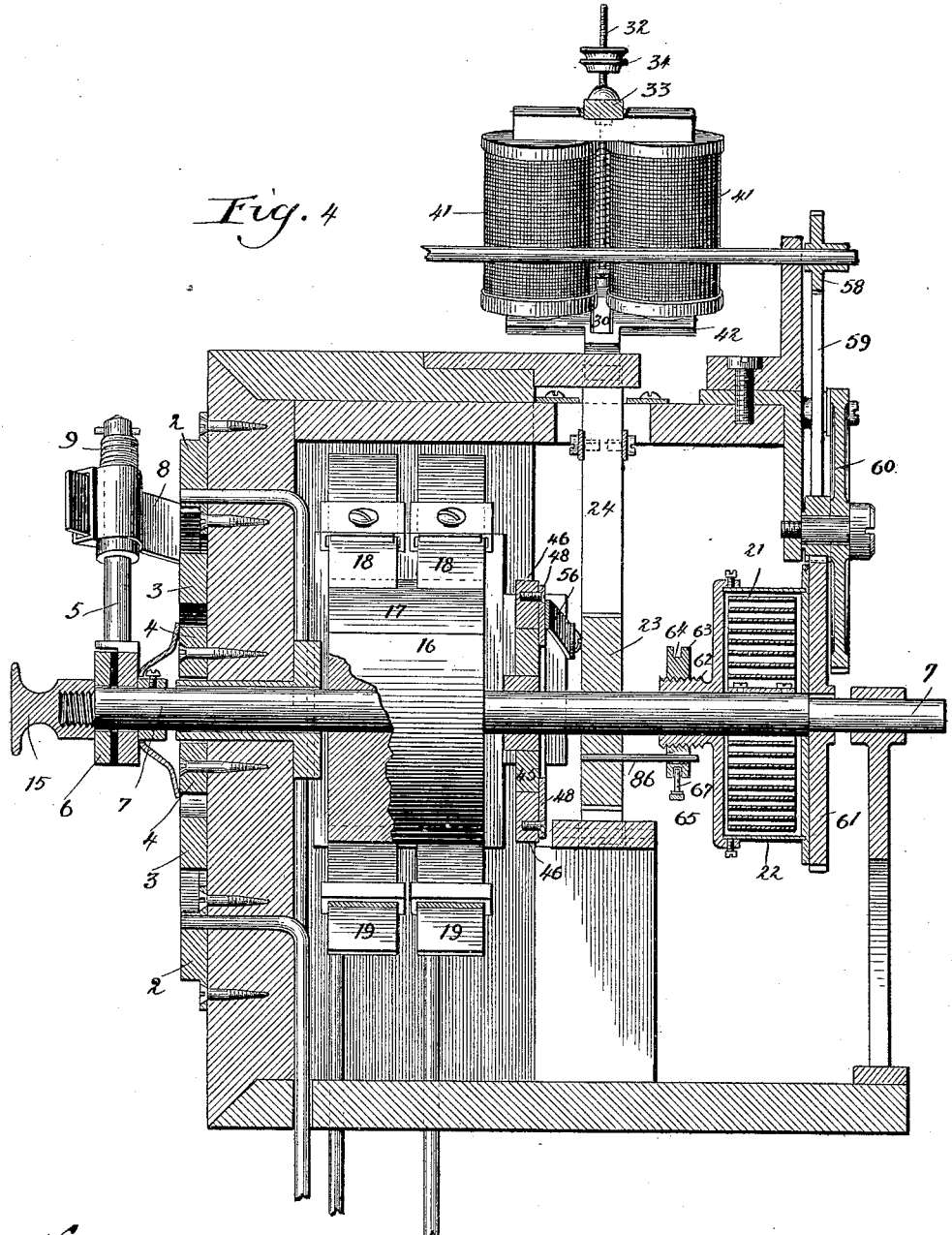

(No Model.) 8 Sheets—Sheet 5.
M. M. KOHN.
APPARATUS FOR SUPPLYING ELECTRICITY FOR LIGHT AND POWER PURPOSES.
No. 524,983. Patented Aug. 21, 1894.
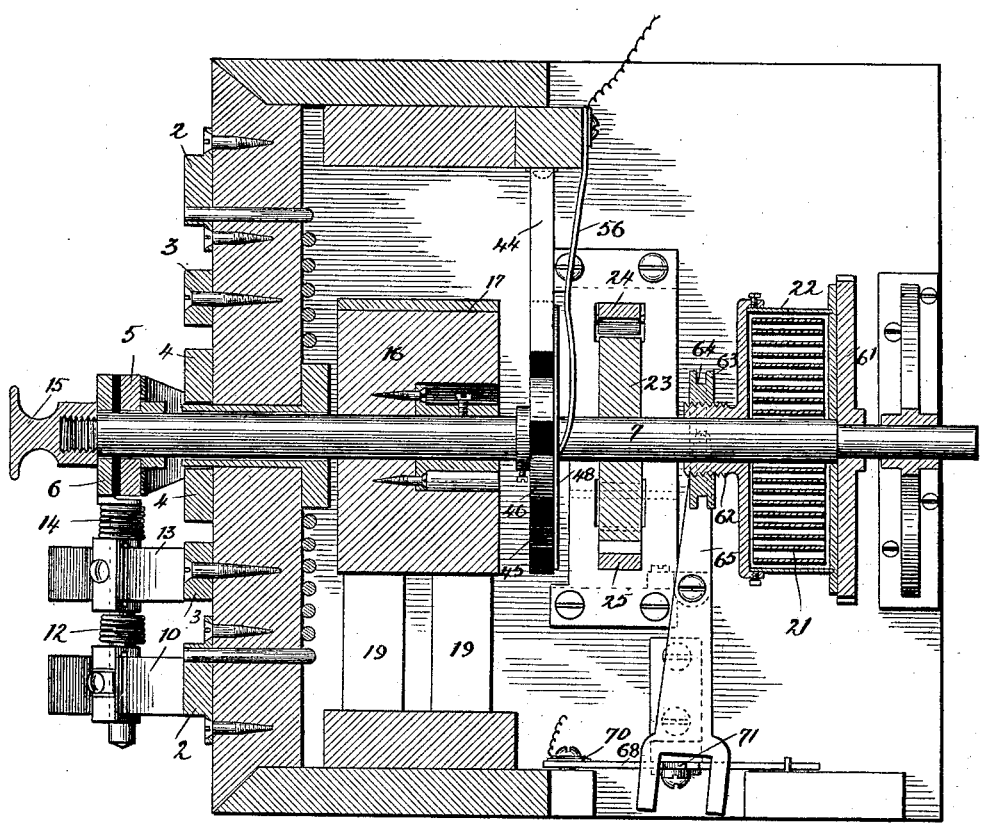

(No Model.) 8 Sheets—Sheet 6.
M. M. KOHN.
APPARATUS FOR SUPPLYING ELECTRICITY FOR LIGHT AND POWER PURPOSES.
No. 524,983. Patented Aug. 21, 1894.
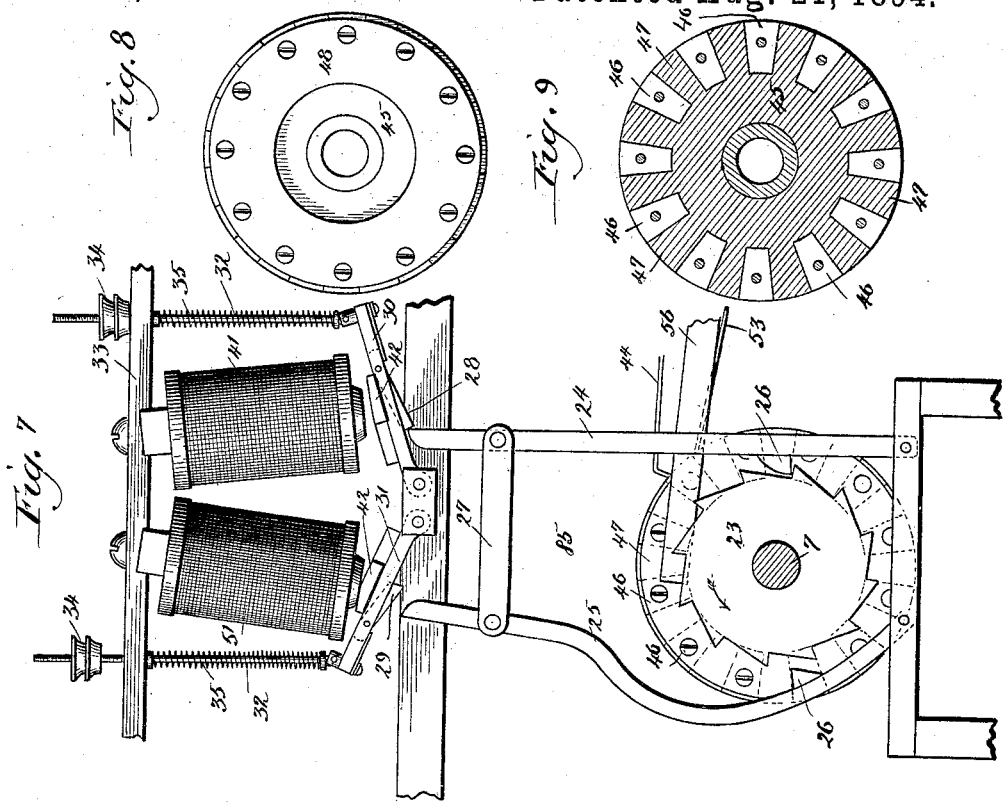
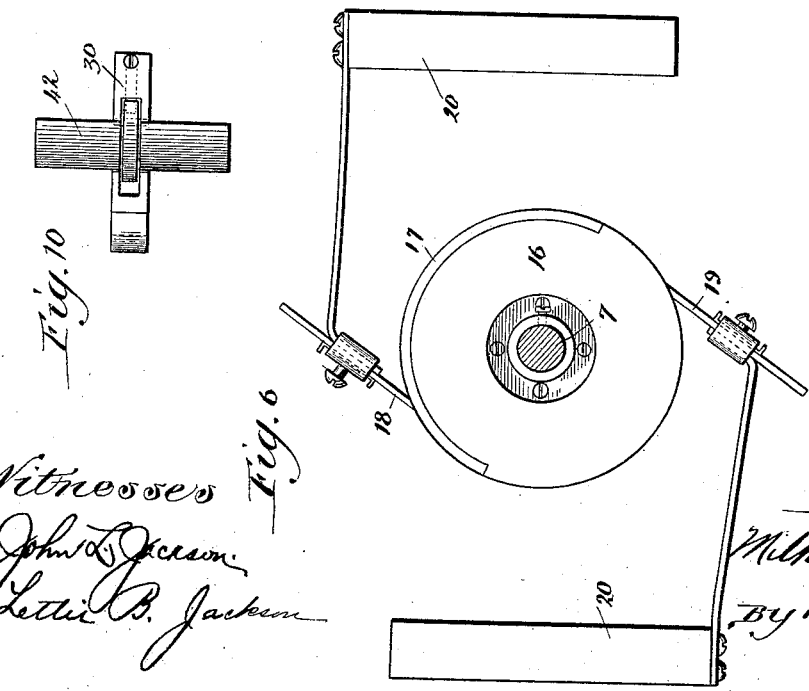
Witnesses
John L. Jackson
Lettie B. Jackson
Inventor
Milton M. Kohn
By Bond & Adams,
Attys.

(No Model.) 8 Sheets—Sheet 7.
M. M. KOHN.
APPARATUS FOR SUPPLYING ELECTRICITY FOR LIGHT AND POWER PURPOSES.
No. 524,983. Patented Aug. 21, 1894.
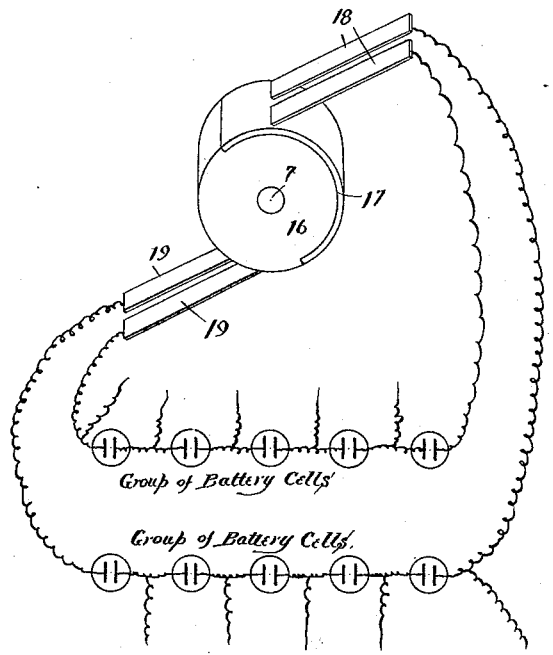
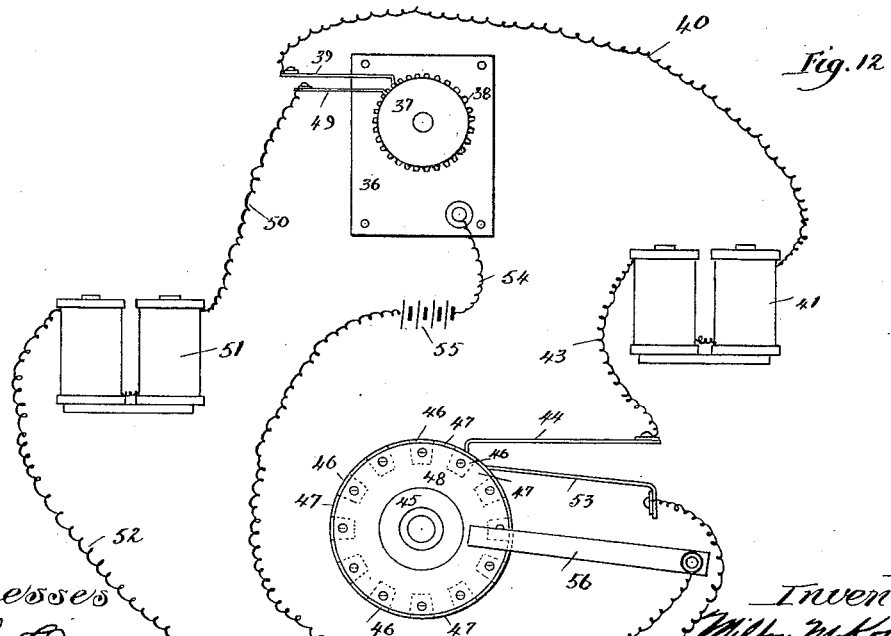
Witnesses
John L. Jackson
Little B. Jackson
Inventor
Milton M. Kohn
By Bond & Adams
Attys.

(No Model.) 8 Sheets—Sheet 8.

M. M. KOHN.
APPARATUS FOR SUPPLYING ELECTRICITY FOR LIGHT AND POWER PURPOSES.

No. 524,983. Patented Aug. 21, 1894.

Witnesses:
John L. Jackson.
Ralph Vandyke.

Inventor
Milton M. Kohn,
by Bond & Adams,
Attorneys.

United States Patent Office.

MILTON M. KOHN, OF CHICAGO, ILLINOIS, ASSIGNOR TO HIMSELF AND SIEGFRIED M. FISCHER, OF SAME PLACE.

APPARATUS FOR SUPPLYING ELECTRICITY FOR LIGHT AND POWER PURPOSES.

SPECIFICATION forming part of Letters Patent No. 524,983, dated August 21, 1894.

Application filed September 24, 1891. Renewed February 17, 1894. Serial No. 500,577. (No model.)

*To all whom it may concern:*

Be it known that I, MILTON M. KOHN, a citizen of the United States, residing at Chicago, in the county of Cook and State of Illinois, have invented a certain new, useful, and Improved Apparatus for Supplying Electricity for Light and Power Purposes, of which the following is a specification, reference being had to the accompanying drawings, in which—

Figure 1:
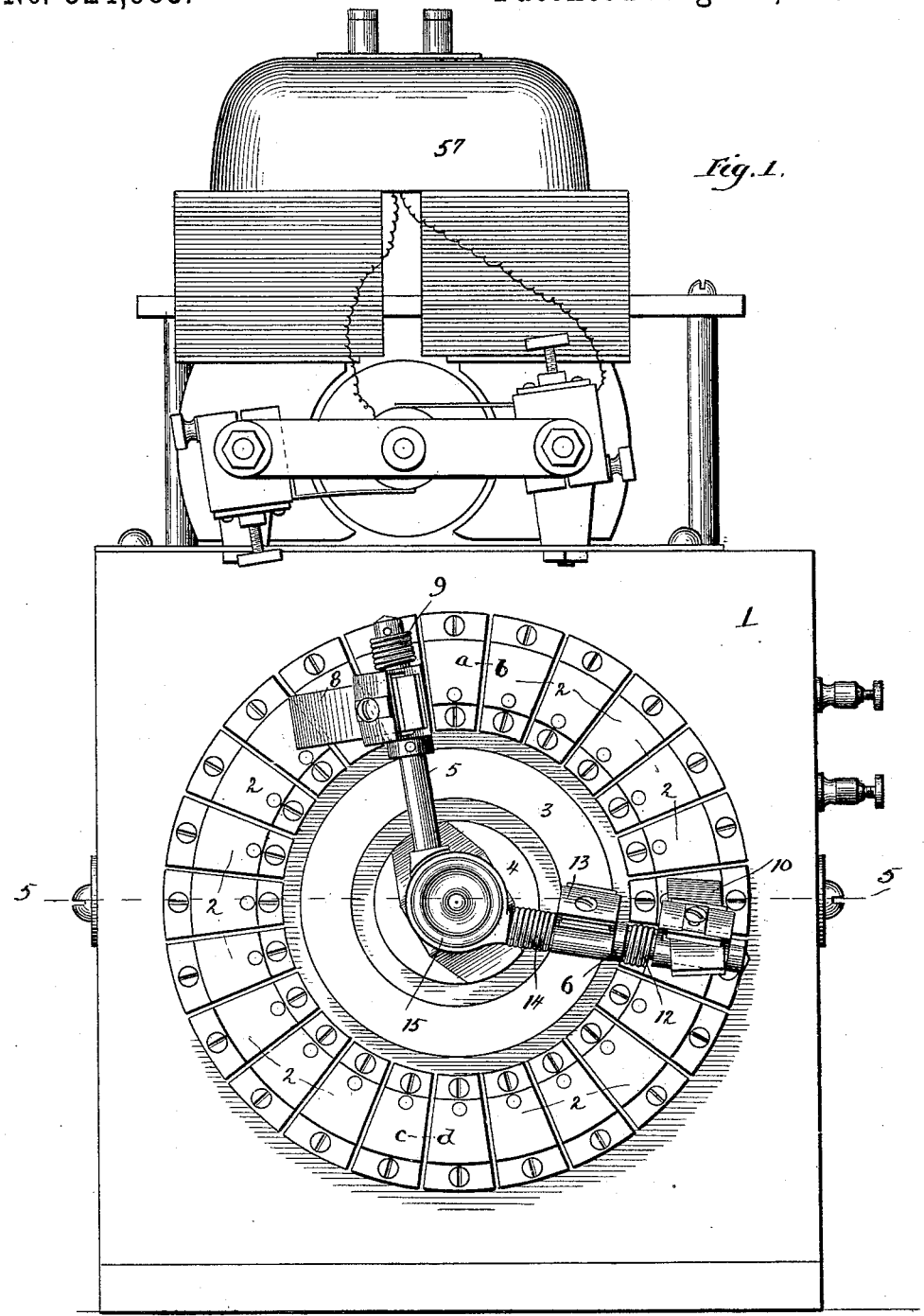
Figure 2:
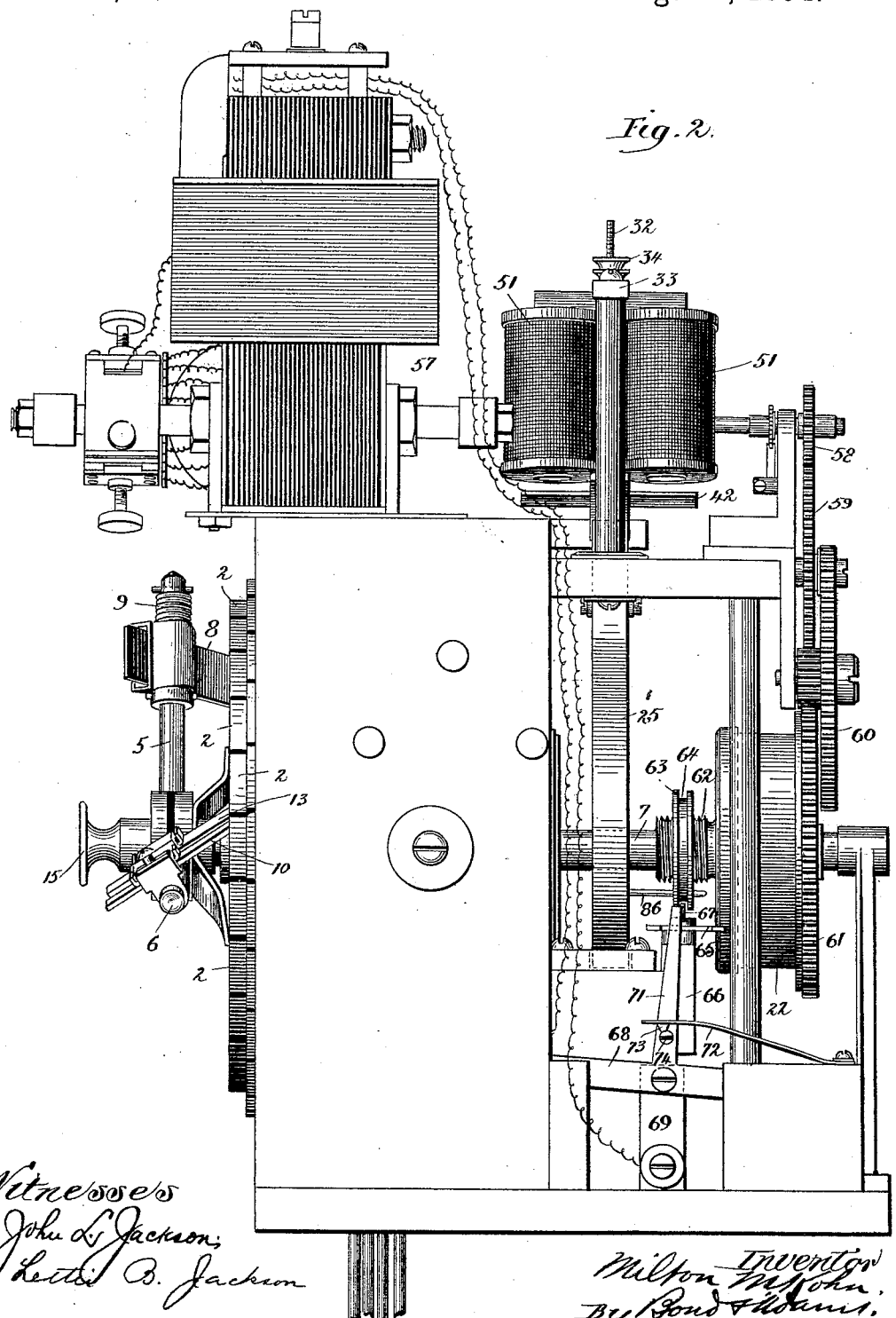
Figure 3:
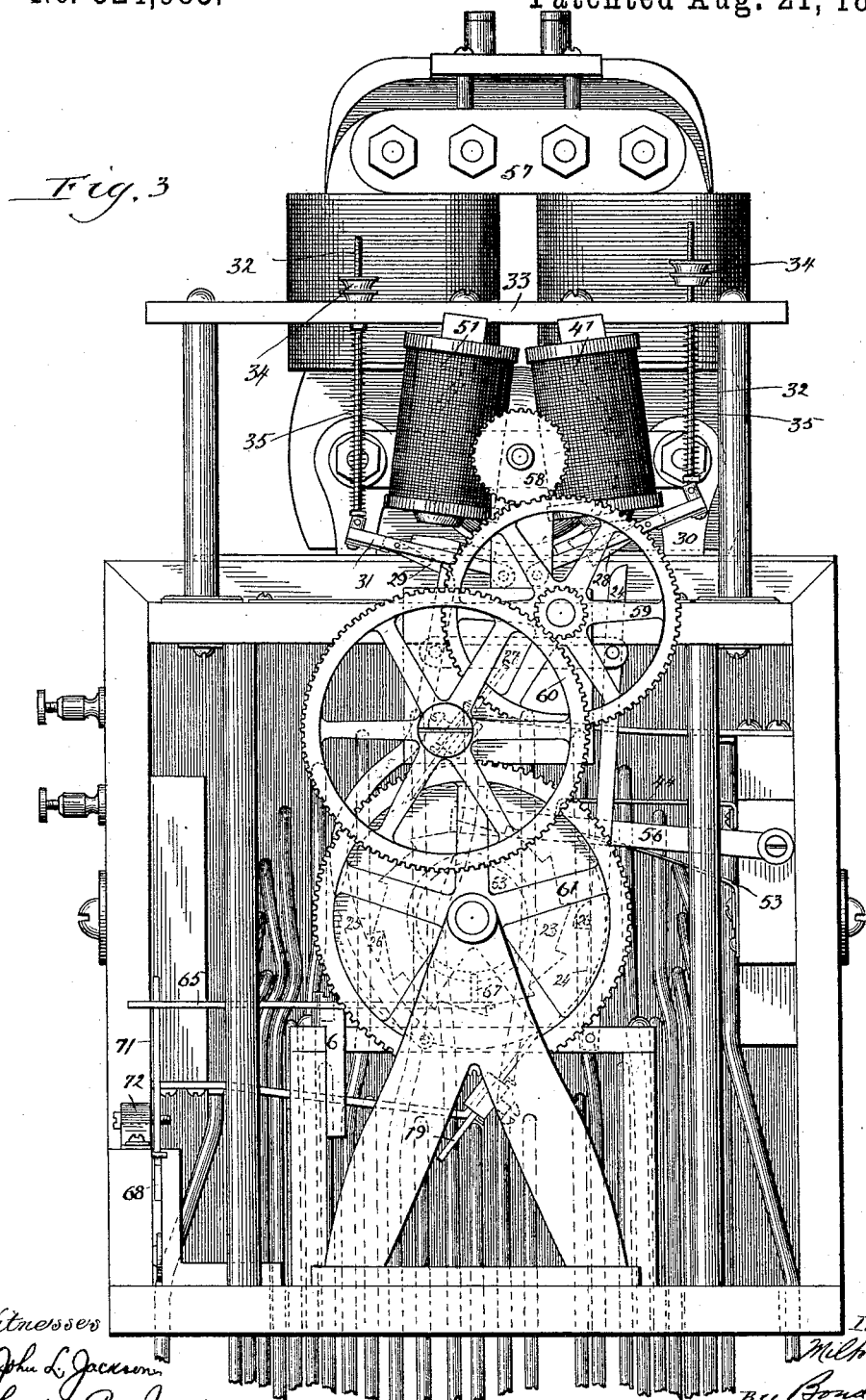
Figure 13:
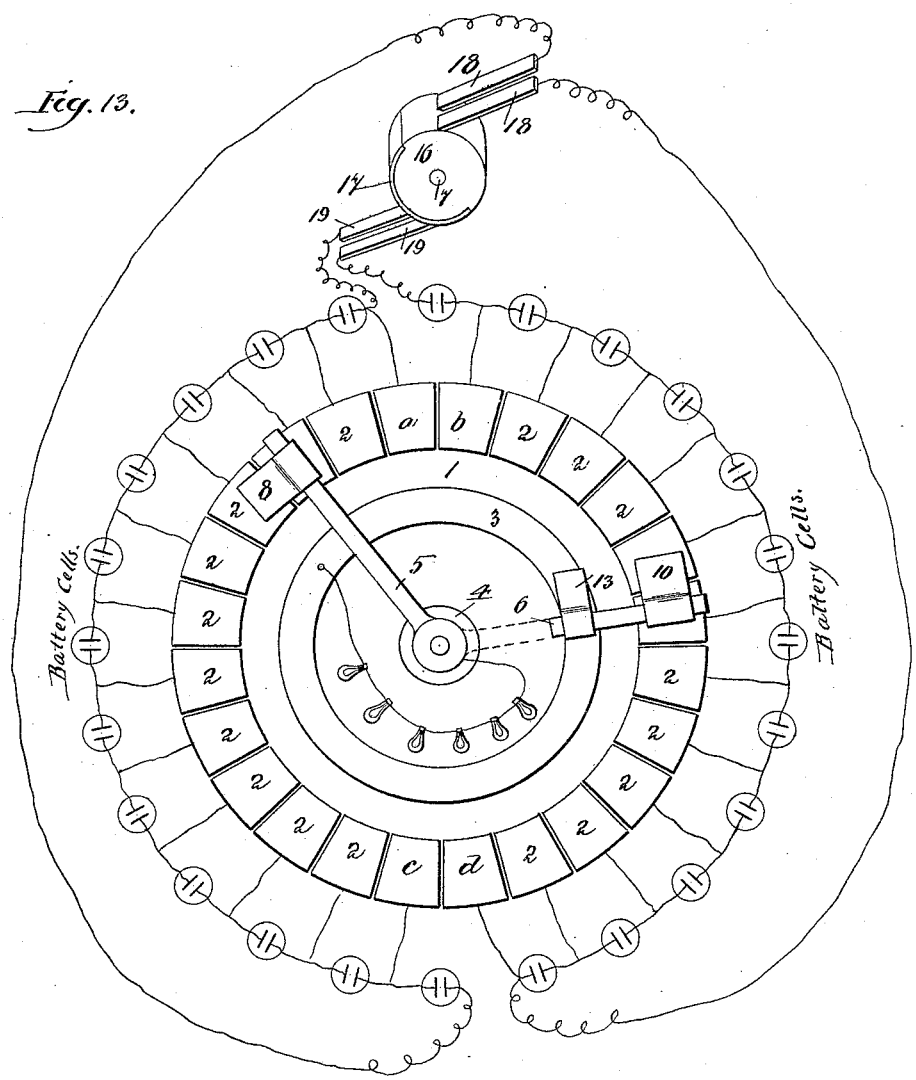

Figure 1, is a front elevation of the switch board and adjacent parts. Fig. 2, is a side elevation of the switch board, winding mechanism and escapement devices. Fig. 3, is a rear elevation of the same. Fig. 4, is a central vertical section of the same, the commutator also being shown. Fig. 5 is a horizontal section on line 5—5 of Fig. 1. Fig. 6 is a detail, being an end elevation of one of the commutators. Fig. 7 is a detail, being an elevation of the escapement. Fig. 8 is a detail, being an end elevation of the commutator which controls the operation of the electromagnets. Fig. 9 is a similar view, the side plate being removed. Fig. 10 is a detail, being a plan view of one of the armatures of the electro-magnets. Fig. 11 is a diagram showing the arrangement of the wires of the battery, and the manner of operation of one of the commutators; and Fig. 12 is a diagram showing the manner of connecting various portions of the apparatus. Fig. 13, is a diagram showing the connections between the battery cells, the contact plates and the commutator.

My invention relates to electric lighting, or the supplying of a current for power purposes, by the use of a primary battery. Heretofore many attempts have been made to devise means whereby primary batteries could be used for more or less extensive electric lighting or power plants, but they have uniformly failed, principally because no primary battery of sufficient power to furnish a constant current of the necessary intensity has yet been produced. In the stronger primary batteries polarization is so great that they soon become exhausted, and cannot be used where it is necessary to maintain a steady current for any great length of time, unless they are given constant attention, which renders them too expensive for practical use.

One of the objects of my invention is to provide an improved system of providing a current for electric lighting or power purposes, by the use of primary batteries, whereby the weakening of the current arising from polarization may be prevented, and the cells maintained at a high degree of efficiency.

Another object of my invention is to provide an improved apparatus for controlling and regulating the generation and use of an electric current, suitable for the above mentioned purposes, under my improved system.

I accomplish these objects as illustrated in the drawings and as hereinafter specified; that which I regard as new will be set forth in the claims.

As hereinbefore suggested, the rapid exhaustion of the stronger primary batteries is well known to be due in great measure to polarization of the negative plate, which takes place when the circuit is closed, and ceases as soon as the circuit is broken. Should the cell remain idle for a short time, the negative plate would become entirely depolarized, and the cell would again be fitted for use. In my improved system of electric lighting, advantage is taken of this fact, and the apparatus is arranged as follows:

To furnish the current for a plant, a battery is provided consisting of a greater number of cells than is necessary to furnish a current of sufficient intensity to do the required work, preferably two or three times the necessary number being provided; as for instance,—if ten cells are necessary to furnish a current to light a certain number of lamps, a battery having twenty or thirty cells should be provided; but a battery consisting of any number of cells more than the number to be used at any one time may be used. The object of this arrangement is to effect a recuperation of the strength of the cells by using each cell continuously for only a short time. This is accomplished by placing in circuit only a portion of all of the cells of the battery, and then at short intervals cutting out one of the old cells and cutting in a new one to take its place. It is evident that by providing the battery with a large number of extra cells, each cell will be used less than if only a few more than the minimum or operating number are provided, and the battery will therefore last longer and be more effective than in the latter case; but a battery consisting of from two to three times the operating number of cells will be found to be large enough to give satisfactory results. In order to equalize the cells, they are connected so that individual cells will be cut into and out of the circuit in rotation, no cell being brought into the circuit a second time until all the cells of the battery have been once used. By this system of arrangement, if the current from ten cells is used, and a new cell is cut into and an old one out of the circuit each minute, each cell will be in circuit only ten consecutive minutes, and will then be given time to recover from the polarization which took place while it was in circuit. The cells are thereby kept fresh and active, the pressure upon the mains is kept constant, and a much stronger current is obtained than if the cells were continuously in circuit; the evil effects of polarization are by this means almost entirely overcome, rendering the battery constant and regular. This system of renewing the battery which furnishes the current constitutes one of the principal parts of my invention. The other part of the invention relates to the apparatus for operating a lighting or power plant under the above described system. It is necessary to practical working under this system that some more or less automatically operating mechanism should be provided to effect the cutting in or out of the cells, for if such work had to be done by an operator it would be made so expensive and imperfect as to be scarcely practicable. I have provided an apparatus for controlling the battery which is so constructed and arranged that when it is connected to the cells of the battery it automatically regulates the cutting in or out of the various cells, and is adapted to operate for an indefinite length of time.

The controlling apparatus which I have provided, after having once been set up, requires no attention whatever, as all its operations are automatic. It operates as soon as the current of the battery is turned on, and continues to operate until the current is turned off; the only attention required being the charging of the battery whenever necessary.

Referring to the drawings,—1, indicates a switch board, upon which are mounted contact plates 2, which are arranged in a circular manner, as best shown in Fig. 1, and are insulated from each other. The contact plates are made of any suitable conductor of electricity, copper being preferably used. Within the circle formed by the contact plates, and concentric with it, is a ring 3, which is made of any suitable conducting material, and is insulated from the contact plates.

4, indicates a central plate, which is also a conductor and is suitably secured upon the switch board within the ring 3, and is insulated from it.

5 and 6, indicate arms, which are secured at their inner ends upon a common shaft 7, mounted in suitable bearings and extending through the center of the plate 4, as best shown in Fig. 4. The arm 5 is provided at its outer end with a brush 8, which is adapted to bear upon the surface of the different contact plates 2 as the arm is moved around by the rotation of the shaft 7. The brush 8 is held more closely in contact with the contact plates by means of a spring 9, which is mounted upon the arm 5, and is secured at one of its ends to a portion of the brush 8 in such manner that the tension of the spring will press the end of the brush 8 upon the surface of the contact plates. The brush 8 is constantly in electrical connection with the arm 5 and plate 4.

10, indicates a brush similar to the brush 8, which is mounted upon the outer end of the arm 6, and is also adapted to bear upon the contact plates 2. A spring 12 similar to the spring 9 is provided, to cause the end of the brush to closely bear upon the surface of the contact plates.

13, indicates another brush, which is also mounted upon the arm 6, and bears upon the surface of the ring 3, as best shown in Fig. 1. These brushes 8 and 10 may be so arranged that their contacting edges lie at an angle to the edges of the contact plates 2, so that during their movement the said brushes respectively are momentarily in contact with two of the contact plates, whereby breaking of the circuit by sudden shifting from one contact plate to another is avoided.

14, indicates a spring similar to the springs 9 and 12, which is adapted to hold the end of the brush 13 in contact with the ring 3. The brushes 10 and 13 are in electrical connection with each other, but are insulated from the arm 5 and from the plate 4.

The brushes 8, 10, and 13 may be adjustably secured upon the arms 5 and 6 respectively, as shown in the drawings, or they may be secured upon the said arms in any other desired manner. The arms 5 and 6 are fitted upon the shaft 7 near one end, and a cap 15 is provided which is adapted to be secured upon the end of the shaft, as best shown in Fig. 4, to hold the arms in position upon the shaft. When it is desired to remove the arms, by moving the cap 15 they may be easily withdrawn from the shaft. The object of the above described arrangement of the contact plates and brushes is to provide for cutting in or out of circuit the various cells of the battery, and this is accomplished as follows:

The cells of the battery are arranged in two equal groups, which are not in circuit with each other, but the cells in each group are connected with each other in series, so that by uniting the wires of the end cells of each group, a current will pass through each cell in the group. The total number of cells in the two groups is equal to the number of contact plates 2 upon the switch board, and the cells are connected successively to successive contact plates. In the drawings, I have shown a switch board having twenty-four contact plates, and with such a switch board a battery would be used having twenty-four cells, arranged in two groups of twelve cells each. If it was desired to use the current from ten cells, the arms 5 and 6 would be arranged at such an angle to each other as to include ten cells between the brushes 8 and 10, as shown in Fig. 1. If the shaft 7 should then be turned so that the brushes 8 and 10 would both bear upon contact plates connected to cells in the same group, the current from ten cells would pass from the contact plate in engagement with one of the brushes, as 10, to the brush 13, and would pass through the brush 13 to the ring 3, which ring forms one of the poles of the line wire. The current would therefore pass from the plate 3, through the line wire, and after performing its work would return to the plate 4, which forms the other pole of the line wire. It would then pass to the arm 5 and through the brush 8, back to the cell at the other end of the ten which are in circuit. The current would be prevented from short circuiting by the fact that the contact plates are all insulated from each other, and also by the fact that because of the arrangement of the cells in groups not in electrical connection, there would be no closed circuit except through the brushes as described. It is evident that as the shaft 7 is rotated, the arms 5 and 6 will be moved around the switch board until one of the brushes, as 8, bears upon a contact plate which is connected to one of the cells of one of the two groups, while the other brush, 10, bears upon a contact plate connected to one of the cells of the other group. When the arms are in this position the circuit would be broken, for the reason that, as above stated, the two groups of cells are not connected with each other. In order to provide for a closed circuit when the arms are in such position, a commutator 16 is provided, which is mounted upon the shaft 7, preferably at a point back of the switch board 1; as best shown in Fig. 4; the commutator being keyed upon the shaft so that it will rotate with the shaft and preserve the same position with relation to the arms 5 and 6.

The particular object of arranging the battery into groups is to prevent short circuiting of the current through the unused cells of the battery. If, for instance, the circuit were closed through all the unused cells, the current, instead of passing through the line wire, would pass through the unused cells, as that would be the path of least resistance. In order to prevent short circuiting, it is necessary that the current should be broken between the unused cells at some point between the two arms. As the arms rotate, if the circuit is so broken at one point in a circle, the cells used will at some times be on opposite sides of the break, and in order to use such cells it is necessary that the circuit should be closed between the two arms and through such cells. For this purpose the commutator is provided. At the same time it is necessary that another break of the circuit should be made between the cells which are now unused, in order to prevent short circuiting through them. In order to effect this, a commutator or commutators must be provided, which will close the circuit at one side and break the circuit at the other side of the two arms.

I prefer to use a single commutator 16, arranged as shown in Fig. 13.

The commutator consists of a cylinder or drum, one half the periphery of which is a conductor and the other half a non-conductor, which construction is preferably obtained by securing upon a wooden cylinder a metallic plate 17, which is of such size as to extend half way around the cylinder. The other half of the cylinder is a non-conductor. To close the circuit between the two groups of cells, brushes 18 and 19 are provided, which are mounted upon supports 20 in such position that they will bear upon opposite portions of the periphery of the commutator. The brushes 18 are connected with the wires at one end of the two groups, and the brushes 19 are connected with the wires at the other end of the two groups, so that when the commutator is in such position that the brushes 18 bear upon the conducting portion 17 of the commutator, the current will pass from one group to the other through the brushes 18 and the commutator, and the circuit will thereby be closed. When the commutator is rotated to an opposite point the circuit will be closed at the other end of the groups of cells by means of the brushes 19, which will then bear upon the conducting portion of the commutator; the brushes 18 then bear upon the insulated portion. The position of the commutator upon the shaft 7 is so arranged that when the brushes 8 and 10 bear upon contact plates connected to cells of different groups, the circuit between the two groups of cells will be closed at one end by means of the brushes resting upon the conducting portion of the commutator. It is evident that the commutator must be so adjusted as to close the circuit at the proper end of the two groups of cells, as otherwise the current will be directed through the wrong cells. If the brushes 8 and 10 are in the position shown in Fig. 1, and the contact plates $a$ and $c$ are connected to the cells at the ends of one group, and the contact plates $b$, $d$ are connected to the end cells of the other group, and it is desired to use the current from ten cells, then the commutator 16 should be so adjusted as to close the circuit between the cells connected to the contact plates $a$, $b$.

By rotating the shaft 7, the arms 5 and 6 will be caused to move around the switch board, and the different cells will be successively cut into and out of circuit by their contact with the brushes 8 and 10; the cells out of circuit being allowed to recuperate for a greater or less length of time, depending upon the number of cells. I do not wish to limit myself to the arrangement of the cells in two groups, as they may be arranged in three or more groups if desired; in such case it will be necessary to arrange the commutator so that it would close the circuit properly.

In order to equalize the use of each cell, the shaft 7 is given a rotary motion, the arrangement being such that the brushes will each bear upon a contact plate for a short space of time, and will then be moved to the next succeeding plate, and so around the board.

When the brushes are arranged as shown in the drawings, it is designed that the shaft 7 will be rotated so as to move the arms 5 and 6 around the face of the switch board in the same direction as that in which the hands of a clock move. The rotation of the shaft 7 is effected by means of a coil spring 21, which is incased in a barrel 22, journaled upon the shaft 7, as best shown in Figs. 4 and 5. A suitable ratchet device is provided to prevent the barrel from rotating upon the shaft except in one direction. One end of the coil spring is secured to the shaft 7, and the other end to the barrel, which is adapted to be rotated upon the shaft to wind up the spring. The arrangement of the spring is such that it will cause the shaft to revolve in the direction indicated. The action of the spring will cause the shaft 7 to rotate continuously, but it is desirable that the arms be given an intermittent rather than a continuous rotary motion, as it is better adapted for the purposes set forth. To effect such an intermittent rotation, an escapement 85 is provided, the operation of which is controlled by a clock, so that the interruptions of the rotation of the shaft 7 will be regular. The escapement 85 consists of a scape wheel 23, which is mounted upon and keyed to the shaft 7, and levers 24 and 25, each of which is provided with a pallet 26 adapted to be engaged by the teeth upon the scape wheel. The levers 24 and 25 are hinged at their lower ends upon a suitable support, and are connected together, preferably near their upper ends, by a strap 27, or any other suitable device. The length of the connecting rod is such that only one of the pallets will engage the scape wheel at a time. The levers are made of the shape shown in Fig. 7, as an easier action is thereby secured, but I do not wish to limit myself to the exact shape therein shown, as it may be varied considerably without materially affecting their operation. The teeth upon the scape wheel and the pallets 26 are so inclined that as the scape wheel rotates in the direction indicated by the arrow in Fig. 7, the tooth of the scape wheel which happens to be in engagement with one of the pallets will have a tendency to move the lever to which such pallet is secured away from the scape wheel, and thereby throw such pallet out of engagement with the scape wheel. The upper ends of the levers 24 and 25 are adapted to be engaged by dogs 28 and 29, mounted upon bars 30 and 31, hinged at their lower ends to a suitable portion of the frame of the apparatus and at their upper ends secured to rods 32. The dogs 28 and 29 are so placed that they will be adapted to hold the ends of either of the levers 24 or 25 in such position that the pallet 26 upon such levers will be held in engagement with one of the teeth upon the scape wheel 23 until it is released by the action of the controlling mechanism. The rods 32 extend upward and pass through suitable orifices in a bar 33, and are provided with nuts 34, secured upon them at the upper side of said bar, as best shown in Fig. 7. The nuts 34 are adapted to screw upon the upper ends of the rods 32, so that the length of the rods below the bar 33 may be adjusted as desired.

35, indicates spiral springs, one of which is placed around each rod 32 below the bar 33, and is adapted to bear at its upper end against the under side of the bar 33, its lower end bearing upon a suitable stop at the lower end of the rod 32, as best shown in Fig. 7. The tension of the springs aids in overcoming the residual magnetism, and insuring the instant release of the armatures from engagement with the magnets, after the current has been cut off.

The mechanism which controls the action of the escapement consists of a clock 36, which in addition to the usual works is provided with a wheel or commutator 37, as represented by the diagram, Fig. 12. The commutator consists of a wheel having teeth 38, which are electrical conductors, the spaces between the teeth being of some non-conducting material, and it is so mounted in the clock that it will rotate with the minute wheel. The number of teeth on the commutator determines in part the rate at which the shaft 7 is to rotate, and I prefer to rotate the shaft at such speed as to cause the brushes 8 and 10 to rest upon each contact plate for the space of one minute for each complete revolution of the shaft. In order to rotate the shaft at this rate of speed, the commutator 37 is provided with thirty teeth.

I do not wish to limit myself to the use of a commutator having any particular number of teeth, as the shaft 7 may be made to rotate at any desired speed by providing the commutator with the proper number of teeth. I also prefer to use an ordinary brass clock, provided with a commutator such as described, as when such a clock is used the teeth 38 will be in electrical connection with all parts of the clock, and in attaching wires it is not necessary to attach them to the teeth, as they may be attached to any other part of the clock frame.

Instead of providing the commutator 37 with teeth, as shown, its periphery may be made up of conducting and non-conducting segments.

39, indicates a brush, one end of which is suitably secured upon or near the clock, being insulated therefrom, and the other end of which is adapted to bear alternately upon one of the teeth 38, and the non-conducting portions of the commutator between the teeth, as the commutator is revolved. The brush 39 is connected by a wire 40 or other suitable conductor, to one of the wires of an electro magnet 41, which is supported from the bar 33, as best shown in Fig. 7. The pole or poles of the magnet are so placed as to be at a point immediately over the bar 30 upon which is secured the dog 28 which engages the upper end of the lever 24. An ordinary armature 42 is suitably secured upon the bar 30 in such position that it may be attracted by the poles of the electro magnet when they are rendered magnetic by the passage of a current of electricity through the helices. The other end of the wire which forms the helices of the electro-magnet is connected by a suitable wire, 43, to a brush 44, which is secured in the frame of the machine and is adapted to bear upon the surface of a commutator 45. The commutator 45 is substantially like the commutator 37 in construction, being provided on its periphery with conducting portions or segments 46, and non-conducting segments 47, arranged successively around its periphery. The number of conducting segments 46, however, is equal to one half the number of contact plates 2. The brush 44 is adapted to bear successively upon the conducting and the non-conducting portions of the commutator 45 as the commutator is rotated. The commutator 45 is mounted upon and keyed to the shaft 7, and is preferably located upon the shaft near the escapement 85, as best shown in Fig. 5. Upon one side of the commutator 45 is carried an annular conducting plate 48, best shown in Fig. 12, which is in electrical connection with all the conducting segments 46.

49, indicates a second brush, which is adapted to bear upon the teeth and non-conducting portions of the commutator 37, its operation being similar to that of the brush 39; and it is connected by a wire 50 to a second electro-magnet 51, supported by the bar 33 in a manner similar to that in which the magnet 41 is supported. The magnet 51 is adapted to attract an armature 52, to operate the dog 29, substantially as the dog 28 is operated. The brushes 39 and 49 are so adjusted with relation to each other that when one of them bears upon one of the teeth 38 upon the commutator 37, the other will rest upon one of the non-conducting portions of the commutator.

52, indicates a wire which is connected to the other end of the wire forming the helix of the magnet 51, which wire 52 is connected to a second brush 53, which is also adapted to bear upon the conducting and non-conducting portions 46 and 47, as best shown in Fig. 12. The arrangement of the brushes 44 and 53 with relation to each other is similar to that of the brushes 39 and 49, and they are adapted to bear upon different segments of the commutator 45.

54, indicates a wire which is connected to the teeth 38 upon the commutator 37, preferably through the brass work of the clock, as above suggested, and after being connected with an electric battery 55, is connected to a brush 56 suitably secured in the frame of the machine, and bearing upon the annular plate 48, and forming a constant connection therewith. The battery 55 may consist of a few independent cells, or the main battery may be used.

The manner in which the above described apparatus operates is as follows:—When the clock is going, the commutator 37 will be rotated with the minute wheel of the clock, and consequently will make one complete revolution in an hour. As it is provided with thirty teeth or conducting segments, for one minute the brush 39 will bear upon one of the teeth 38, and for the next minute it will bear upon one of the non-conducting segments or portions between the teeth. When the brush 39 bears upon one of the teeth, the circuit will be closed and the current will pass along the wire 40 through the electro magnet 41, to the brush 44, which is so arranged that at that time it will bear upon one of the conducting segments 46 of the commutator 45, as best shown in Fig. 12. As the plate 48 is in electrical connection with the battery and clock, and also with all the segments 46, the magnet 41 will then become active and will attract its armature, raising the bar 30. This will release the upper end of the lever 24, and permit the scape wheel 23 to act upon the pallet 26 upon the lever 24, forcing it away from said wheel, and consequently drawing the lever 25 toward the scape wheel, and bringing its pallet 26 into engagement with one of the teeth upon the scape wheel. The upper end of the lever 25 will at the same time be held in its new position by the dog 29 upon the bar 31, by reason of the fact that as there is no magnetism in the core of the electro magnet 51, the springs 35, together with gravity, will force the bar 31 downward, and will permit the dog 29 to engage the upper end of the lever 25. The various parts will remain in this position for the space of one minute, during which the commutator 37 will turn a distance equal to one sixtieth of its circumference, causing the brush 49 to bear upon one of the teeth 38, and the brush 39 to rest in the space between two of the teeth 38. The current will then be shifted to the wire 50, and will pass through the magnet 51 and wire 52 to the brush 53, which will then bear upon one of the conducting portions 46, as above described. The circuit will then be completed through the brush 56 and clock, as in former case. This will magnetize the core of the magnet 51, which will attract the armature 52 and will lift the bar 31 to the position shown in Fig. 7; the lever 25 will thereby be released, and by the operation of the scape wheel 23 upon the pallet, it will be moved away from the wheel, and the lever 24 will be thrown toward said wheel until its upper end will be engaged by the dog 28, as shown. The pallets 26 upon the levers 24 and 25 are so placed that the scape wheel 23 will be permitted to rotate a distance equal to one half the space between the successive teeth of the wheel after its release from each of the pallets. This will permit the scape wheel 23 to move the space of one notch at each complete reciprocation of the levers 24 and 25.

By providing the scape wheel with one half as many teeth as there are divisions or segments 46 and 47 upon the commutator 45, it is evident that when the scape wheel moves half the space between the successive teeth, which, in the above described construction, it does each minute, the commutator 45 will rotate a distance equal to the width of one of the segments 46 or 47, and by providing the commutator with as many segments as there are contact plates 2 upon the switch board 1, the brushes 8 and 10 will be caused to bear upon each segment for the space of one minute consecutively.

57, indicates an electric motor, which is used to wind up the spring 21 when it has nearly run down, so that the regulating device may be kept constantly in operation. The electric motor 57 may be of any desired pattern, and it is preferably mounted upon the top of the frame which contains the various parts of the regulating mechanism. The motor is geared by means of suitable gear wheels 58, 59, and 60, to a gear wheel 61 secured upon the barrel 22, as best shown in Figs. 2 and 4. The gear wheels are so arranged that when the motor is in operation the barrel will be turned in such a direction that the spring 21 will be wound up.

62, indicates a guide screw, which is mounted upon the shaft 7, and is secured to the barrel 22, being preferably formed integral with the inner portion of said barrel. Mounted upon the screw 62 is a wheel 63, which is adapted to move lengthwise of the shaft 7 upon said screw, and is provided with a groove 64 around its periphery. The wheel 63 is locked to the scape wheel 23 by means of a rod 86, which at one end is rigidly secured to the scape wheel, and at the other end passes through a hole in the wheel 63. This construction, while it locks the scape wheel 23 and wheel 63 together, permits longitudinal motion of the wheel 63 upon the guide screw 62. Two or more rods 86 may be provided if desired.

65, indicates a lever for operating a switch, which lever is horizontally mounted upon a standard 66, as best shown in Fig. 2. The inner end of the lever 65 is provided with a pin 67, which is so placed that it is adapted to fit into the groove 64 in the periphery of the wheel 63, so that when the wheel 63 moves upon the guide screw 62, it will carry the inner end of the lever with it. The outer end of the lever 65 is forked, as best shown in Fig. 5.

68, indicates a switch-bar, which is pivoted upon a suitable standard 69, and is adapted to be moved into or out of engagement with a plate 70, which is secured in a convenient position.

71, indicates a lever for operating the switch bar 68, which lever projects upward and into the fork at the end of the lever 65, as best shown in Figs. 2 and 5. The switch bar 68 is electrically connected to one of the wires of the electric motor 57, and the plate 70 is connected with the other wire, so that when the switch bar 68 is in contact with the plate 70 the circuit will be closed and the motor will be set in operation. A suitable battery, which may be the main battery or an independent one, for running the motor, is placed at any convenient point in the circuit. The arrangement is such that as the spring 21 is unwound, the wheel 63 and shaft 7 will rotate, causing the wheel 63 to move upon the guide screw 62 toward the drum 21. The inner end of the lever 65 will thereby be moved in the same direction. This will throw the outer end of the lever in an opposite direction, and the lever 71 will thereby be carried in the same direction, throwing the switch bar 68 into contact with the plate 70 and closing the circuit. This will set the motor in operation and the spring 21 will be wound up. As the spring is wound up, the wheel 63 will be moved in an opposite direction on the guide screw, and when the spring is fully wound up the lever 71 will be moved back by the lever 65 and the circuit will be broken, thereby stopping the motor. It is evident that it is immaterial in which direction the wheel 63 moves, provided the switch is correspondingly arranged.

The fork in the end of the lever 65 is preferably made quite large, so that the lever 71 will be operated only when the lever 65 is near either end of its stroke.

72, indicates a spring, which is provided with a tooth 73, adapted to engage a pin 74 upon the lever 71. The tooth 73 and pin 74 are adapted to prevent the lever 71 from moving except as it is moved by the lever 65. By this construction the operation of the devices for regulating the cutting in or out of the various cells may be made to continue for any desired length of time, as the motor acts automatically to wind up the spring as soon as it has run down, and is automatically cut out as soon as it accomplishes its work.

I have described the battery as consisting of a number of single cells, but instead it may be made up of a number of minor batteries, preferably connected in multiple arc, each of which minor batteries is connected to a contact plate; and the several minor batteries connected in series to form the groups of the main battery.

In practicing under my improved system, and with the apparatus above described, the arrangement is such that single cells are cut into and out of circuit to maintain a constant current, and this is the construction which I prefer, as under ordinary circumstances it secures the best results; I do not wish to limit myself, however, to cutting in and out single cells, as the arrangement may be so made that any number of cells less than the whole number in circuit may be cut in at any interval, and an equal number cut out, provided the intervals of shifting be such as to prevent the used cells from deteriorating sufficiently to cause a marked change in the intensity of the current when the change of cells is made; the fewer the cells cut in and out at any one interval, however, the better the results which are obtained; the essential feature of the invention being cutting in new cells and cutting out an equal number of old cells, and continuing such operation at intervals of time to keep the strength of the battery constant.

That which I claim as new, and desire to secure by Letters Patent, is—

1. The combination with an electric battery comprising a number of cells electrically connected in series, of means for cutting out old cells and simultaneously cutting in new cells to keep the strength of the battery constant, and means for preventing short circuiting of the cells.

2. The combination with an electric battery consisting of a number of cells electrically connected together, of line wire poles, circuit-closing devices acting to close the circuit through less than the whole number of cells of the battery and the line wire poles, to cause the current from the cells so cut in to flow to the line wires, mechanism for cutting in fresh cells of the battery and for cutting out old ones to keep the strength of the battery constant, and means for preventing short-circuiting of the current through the unused cells, substantially as described.

3. The combination with an electric battery consisting of a number of cells electrically connected together, of line wire poles, circuit closing devices adapted to close the circuit through less than the whole number of cells and the line wire poles, to cause the current from the cells so cut in to flow to the line wires, mechanism for automatically cutting in single fresh cells of the battery successively and for automatically cutting out single old cells in rotation, and means for preventing short circuiting of the current through the unused cells, substantially as described.

4. The combination with an electric battery consisting of a number of cells electrically connected together, of line wire poles, circuit closing devices adapted to close the circuit through less than the whole of cells and the line wire poles to cause the current from the cells so cut in to flow to the line wires, mechanism for automatically cutting in single fresh cells of the battery continuously and for automatically cutting out single old cells as the fresh cells are cut in, and means for preventing short circuiting of the current through the unused cells, substantially as described.

5. The combination with an electric battery consisting of a number of cells electrically connected together, and a series of contact plates connected successively to successive battery cells, of line wire poles, circuit-closing devices connected to said line wire poles and adapted to be moved into contact with the contact plates to close the circuit through a number of the cells and the line wires, devices operating to break the circuit through the unused cells to prevent short-circuiting, and means for shifting said circuit-closing devices to cut out old cells and to cut in new ones, substantially as described.

6. The combination with an electric battery consisting of a number of cells electrically connected together, and a series of contact plates arranged in a circle and connected successively to successive cells of the battery, of line wire poles, circuit-closing devices connected to said line wire poles and adapted to be moved into contact with the contact plates to close the circuit through a number of the cells and the line wires, mechanism for moving said circuit-closing devices into contact with the different contact plates, and devices operating to break the circuit through the unused cells to prevent short-circuiting, subtantially as described.

7. The combination with an electric battery consisting of a number of cells electrically connected together, and a series of contact plates arranged in a circle and connected successively to successive cells of the battery, of line wire poles, arms pivoted at the center of the circle and adapted to bear upon the contact plates, said arms being in circuit with the line wire poles, whereby they will operate to conduct the current from a number of the cells of the battery to the line wire poles, mechanism for moving said arms around the circle to bear successively upon the different contact plates, and devices operating to break the circuit through the unused cells to prevent short-circuiting, substantially as described.

8. The combination with an electric battery consisting of a number of cells electrically connected together, and a series of contact plates arranged in a circle and connected successively to successive cells of the battery, of line wire poles, arms pivoted at the center of the circle and adapted to bear upon the contact plates, said arms being in electrical connection with the line wire poles, whereby they will operate to close the circuit through a number of the cells of the battery and the line wires, means for adjusting said arms with relation to each other, devices for locking said arms together whereby they may be rotated together over the contact plates, mechanism for moving said arms constantly in one direction over the contact plates, and devices operating to break the circuit through the unused cells to prevent short-circuiting, substantially as described.

9. The combination with an electric battery consisting of a number of cells electrically connected together, and a series of contact plates 2 arranged in a circle and connected successively to successive cells of the battery, of line wire poles 3 and 4, arms 5 and 6 pivotally mounted at the center of the circle and in electrical communication with said line wire poles, said arms carrying brushes 8 and 10 adapted to bear upon the surface of the contact plates, mechanism for rotating the arms 5 and 6 together over the contact plates, and devices operating to break the circuit through the unused cells to prevent short-circuiting, substantially as described.

10. The combination with an electric battery consisting of a number of cells electrically connected together, and a series of contact plates arranged in the form of a circle and connected successively to the successive cells of the battery, of line wire poles, circuit-closing arms pivoted at the center of the circle and connected to said line wire poles, said arms carrying brushes adapted to bear upon the surface of the contact plates, mechanism for intermittently shifting said circuit closing arms simultaneously to successive contact plates, whereby the cells in circuit will be changed at stated intervals of time while the total number of cells in circuit will not be changed thereby keeping the strength of the current constant, and devices operating to break the circuit through the unused cells to prevent short-circuiting, substantially as described.

11. The combination with an electric battery consisting of a number of cells electrically connected together, and a series of contact plates arranged in the form of a circle and connected successively to successive cells of the battery, of line wire poles, circuit closing arms 5 and 6 pivotally mounted at the center of the circle and connected to said line wire poles, said arms carrying brushes 8 and 10 adapted to bear upon the contact plates, the contact ends of said brushes being at an angle to the edges of the contact plates, springs 9 and 12 acting to hold said brushes in engagement with said contact plates, mechanism for moving said circuit-closing brushes into contact with the different contact plates, and devices operating to break the circuit through the unused cells to prevent short-circuiting, substantially as described.

12. The combination with a battery consisting of a number of cells, and a series of contact plates 2 arranged in the form of a circle, of line wire poles consisting of plates 3 and 4 arranged concentrically within the circle formed by said contact plates, arms 5 and 6 pivotally mounted at the center of the circle, said arm 5 having a brush 8 adapted to bear against the surface of the contact plates, and said arm 6 carrying a brush 10 adapted to bear upon the surface of the contact plates, and brush 13 adapted to bear upon the surface of the plate 3, the brush 8 being in electrical connection with the plate 4, and the brushes 10 and 13 being in electrical connection with each other, and mechanism for revolving said arms, substantially as and for the purpose specified.

13. The combination with a number of cells arranged in two groups, the cells in each group being electrically connected together, and a switch-board having contact plates each of which is connected to one of the cells, of devices for electrically connecting the end cells of the groups alternately at opposite ends of the groups, and devices for completing the circuit through the switch-board, substantially as and for the purpose specified.

14. The combination with a number of cells arranged in two groups, the cells in each group being electrically connected together, and a switch-board having contact plates each of which is connected to one of the cells, of devices for electrically connecting the end cells of the groups, and devices for completing the circuit through the switch-board, substantially as and for the purpose specified.

15. The combination with a number of cells arranged in two groups, the cells in each group being electrically connected together, and a switch-board having contact plates connected to the several cells, of brushes for completing the circuit through the switch-board, said brushes being adapted to be moved upon the contact plates to cut the cells into and out of circuit successively, and devices operated by the movement of said brushes to electrically connect the cells alternately at opposite ends of the groups, substantially as and for the purpose specified.

16. The combination with a number of cells arranged in two groups, the cells in each group being electrically connected together to form a battery, and a switch-board consisting of a number of contact plates, each plate being successively connected to one of the several cells of the groups, said contact plates being arranged in the form of a circle, of devices adapted to be moved around said circle for closing the circuit through a number of the cells, and a commutator consisting of a cylinder, one-half of the periphery of which is a conductor, the other half being a non-conductor, brushes adapted to bear upon opposite portions of the periphery of said commutator, the brushes which bear upon one side being in electrical connection with different groups of cells, and the brushes which bear upon the opposite side of the commutator also being in electrical connection with different groups of the two groups of cells, mechanism for moving said circuit-closing devices around the circle to successively cut in fresh cells and to cut out exhausted cells, and mechanism for rotating the commutator, substantially as and for the purpose specified.

17. The combination with a number of cells arranged in two groups, the cells in each group being electrically connected together to form a battery, and a switch-board consisting of a number of contact plates 2 arranged in the form of a circle, a shaft journaled at the center of the circle, arms mounted upon said shaft, and brushes carried by said arms, and adapted to bear upon said contact plates to close the circuit through a number of the cells, of a commutator mounted upon said shaft, said commutator consisting of a cylinder, one-half of the periphery of which is a conductor, the other half being a non-conductor, brushes adapted to bear upon opposite portions of the periphery of said commutator, the brushes which bear upon one side being in electrical connection with different groups of cells, and the brushes which bear upon the opposite side of the commutator also being in electrical connection with different groups of the two groups of cells, mechanism for moving said circuit-closing devices around the circle to successively cut in fresh cells and to cut out exhausted cells, and mechanism for rotating said shaft, substantially as and for the purpose specified.

18. The combination with a number of cells arranged in two groups, the cells in each group being electrically connected together, and a switch-board having contact plates connected to the several cells, of devices for completing the circuit through the switch-board, said circuit-closing devices being adapted to be moved around the switch-board to bear upon the different contact plates successively, and a commutator 16, a portion of its periphery consisting of some conducting substance, the remaining portion of its periphery being a non-conductor, brushes 18 and 19 adapted to bear upon opposite portions of the periphery of the commutator, and wires connecting the brushes 18 with the two groups of cells at one end, and the brushes 19 with the two groups of cells at the other end, substantially as and for the purpose specified.

19. The combination with the switch-board 1, consisting of contact plates 2, line wire poles 3 and 4, and arms 5 and 6, having brushes 8, 10, and 13 arranged substantially as described, of the commutator 16, brushes 18 and 19, and battery cells arranged in two groups and connected to the contact plates 2 and to the brushes 18 and 19, substantially as and for the purpose specified.

20. The combination with a battery consisting of a number of cells, of a series of contact plates arranged in a circle, said plates being connected successively to successive cells of the battery, devices adapted to bear upon the contact plates to close the circuit through a number of the cells, and spring-actuated mechanism for causing an intermittent motion of said circuit-closing devices to cause them to bear successively upon the different contact plates, substantially as and for the purpose specified.

21. The combination with a battery consisting of a number of cells, of a series of contact plates arranged in a circle, said plates being connected successively to successive cells of the battery, devices adapted to bear upon the contact plates to close the circuit through a number of the cells, and mechanism for causing an intermittent motion of said circuit-closing devices to cause them to bear successively upon the different contact plates, substantially as and for the purpose specified.

22. The combination with an electric battery consisting of a number of cells electrically connected together, of a series of contact plates arranged in a circle, said plates being connected successively to successive cells of the battery, line wire poles, a rotatable shaft, circuit-closing devices carried by said shaft and adapted to be moved into contact with the contact plates, said circuit-closing devices being connected to the line wire poles whereby the circuit will be closed through a number of the battery cells and the line wires, mechanism for rotating said shaft, escapement devices acting upon said shaft to cause it to rotate intermittently, whereby the circuit-closing devices will be shifted at stated intervals of time to different contact plates, and devices operating to break the circuit through the unused cells of the battery to prevent short-circuiting, substantially as described.

23. The combination with a battery consisting of a number of cells, of a series of contact plates arranged in a circle, said plates being connected successively to successive cells of the battery, a rotatable shaft, and brushes mounted upon said shaft and adapted to bear upon the contact plates to close the circuit through a number of the cells, mechanism for rotating said shaft, a scape wheel 23 mounted upon said shaft, levers 24 and 25, pallets 26 adapted to be engaged by the teeth upon the scape wheel 23, and devices adapted to engage the ends of the levers 24 and 25 alternately, to hold the pallets in engagement with the scape wheel, substantially as and for the purpose specified.

24. The combination with a battery consisting of a number of cells, of a series of contact plates arranged in a circle, said plates being connected successively to successive cells of the battery, a rotatable shaft, brushes mounted upon said shaft and adapted to bear upon the contact plates to close the circuit through a number of the cells, mechanism for rotating said shaft, a scape wheel 23 mounted upon said shaft, levers 24 and 25 mounted at their lower ends upon a suitable support, a bar 27 connecting said levers, pallets 26 adapted to engage the teeth upon said scape wheel, bars 30 and 31, dogs 28 and 29 carried thereby and adapted to engage the ends of said levers, and devices for withdrawing said dogs from engagement with said levers, substantially as and for the purpose specified.

25. The combination with a battery consisting of a number of cells, of a series of contact plates arranged in a circle, said plates being connected successively to successive cells of the battery, a rotatable shaft, brushes mounted upon said shaft and adapted to bear upon the contact plates to close the circuit through a number of the cells, mechanism for rotating said shaft, a scape wheel 23 mounted upon said shaft, levers 24 and 25 hinged at their lower ends upon a suitable support, a bar 27 connecting said levers, pallets 26 adapted to engage the teeth upon said scape wheel, bars 30 and 31, armatures carried by said bars, electro magnets 41 and 51 adapted to attract said armatures to lift the bars, and devices for conducting an electric current alternately to the magnets 41 and 51, substantially as and for the purpose specified.

26. The combination with a battery consisting of a number of cells, of a series of contact plates arranged in a circle, said plates being connected successively to successive cells of the battery, a rotatable shaft, brushes mounted upon said shaft and adapted to bear upon the contact plates to close the circuit through a number of the cells, mechanism for rotating said shaft, a scape wheel 23 mounted upon said shaft, levers 24 and 25 hinged at their lower ends upon a suitable support, a bar 27 connecting said levers, pallets 26 adapted to engage the teeth upon said scape wheel, bars 30 and 31, rods 32, caps 34, adapted to screw upon the upper ends of said rods, springs 35 upon said rods, armatures carried by said bars 30 and 31, electro magnets 41 and 51 adapted to attract said armatures to lift the bars, and devices for conducting an electric current alternately to the magnets 41 and 51, substantially as and for the purpose specified.

27. The combination of an electric battery consisting of a number of cells electrically connected together, with a series of contact plates arranged in a circle, said plates being connected successively to successive cells of the battery, line wire poles, a rotatable shaft, circuit-closing devices carried by said shaft and adapted to be moved into contact with the contact plates, said circuit-closing devices being connected to the line wire poles whereby the circuit will be closed through a number of the battery cells and the line wires, mechanism for rotating said shaft, escapement devices acting upon said shaft to cause it to rotate intermittently, whereby the circuit-closing devices will be shifted at stated intervals of time to different contact plates, electromagnets acting to control the operation of said escapement devices, and devices operating to break the circuit through the unused cells of the battery to prevent short-circuiting, substantially as described.

28. The combination with a battery consisting of a number of cells, a series of contact plates arranged in a circle, said plates being connected successively to successive cells of the battery, a rotatable shaft, brushes mounted upon said shaft and adapted to bear upon the contact plates to close the circuit through a number of the cells, mechanism for rotating said shaft, and escapement devices for causing an intermittent rotation of the shaft, of electro magnets 41 and 51 for operating the escapement devices, a commutator mounted upon said shaft, said commutator consisting of a disk, the periphery of which is composed alternately of conducting and non-conducting segments, a plate connecting said conducting segments, and brushes adapted to bear upon said commutator, the arrangement being such that by the rotation of the commutator a current of electricity will be conducted alternately to the magnets 41 and 51, substantially as and for the purpose specified.

29. The combination with an electric battery consisting of a number of cells electrically connected together, of a series of contact plates arranged in a circle, said plates being connected successively to successive cells of the battery, line wire poles, a rotatable shaft, circuit-closing devices carried by said shaft, and adapted to be moved into contact with the contact plates, said circuit-closing devices being connected to the line wire poles whereby the circuit will be closed through a number of the battery cells and the line wires, mechanism for rotating said shaft, escapement devices acting upon said shaft to cause it to rotate intermittently, whereby the circuit-closing devices will be shifted at intervals of time to different contact plates, mechanism acting to control the operation of said escapement devices so that they will operate at regular intervals of time, whereby the cells will be changed at regular intervals, and devices operating to break the circuit through the unused cells of the battery to prevent short circuiting, substantially as described.

30. The combination with a shaft, a commutator 45 mounted thereon, said commutator having conducting portions 46, non-conducting portions 47, and a conducting plate 48, of brushes 44, 53, and 56 adapted to bear upon said conducting and non-conducting portions, mechanism for rotating said shaft, an electric battery, one of the poles of which is connected to the brush 56, and mechanism connected to the other pole of the battery adapted to close the circuit alternately through the brushes 44 and 53, substantially as and for the purpose specified.

31. The combination with a shaft, and a commutator 45 mounted thereon, said commutator having conducting portions 46, non-conducting portions 47, and a conducting plate 48, of brushes 44, 53 and 56 adapted to bear upon said conducting and non-conducting portions, mechanism for rotating said shaft, an electric battery, one of the poles of which is connected to the brush 56, and a clock connected to the other pole of the battery, adapted to close the circuit alternately through the brushes 44 and 53, substantially as and for the purpose specified.

32. The combination with a shaft, a commutator mounted thereon, said commutator having conducting portions 46, non-conducting portions 47, and a conducting plate 48, of brushes 44, 53, and 56 adapted to bear upon said conducting and non-conducting portions, mechanism for rotating said shaft, an electric battery, one of the poles of which is connected to the brush 56, electro magnets 41 and 51 in circuit between the brushes 44 and 53 respectively, and a clock connected to the other pole of the battery, adapted to close the circuit alternately through the brushes 44 and 53, substantially as and for the purpose specified.

33. The combination with a shaft, and a commutator mounted thereon, said commutator having conducting portions 46, non-conducting portions 47, and a conducting plate 48, of brushes 44, 53, and 56 adapted to bear upon said conducting and non-conducting portions, mechanism for rotating said shaft, an electric battery, one of the poles of which is connected to the brush 56, electro magnets 41 and 51 in circuit between the brushes 44 and 53 respectively, and a clock having a commutator 37, said commutator 37 having conducting portions or teeth 38, brushes 39, 49, adapted to bear alternately upon said teeth to close the circuit alternately through the brushes 44 and 53, substantially as and for the purpose specified.

34. The combination with a battery consisting of a number of cells electrically connected together, a series of contact plates arranged in a circle and connected successively to successive cells of the battery, a rotatable shaft, brushes carried by said shaft and adapted to bear upon the contact plates, and line wire poles connected to said brushes whereby the circuit may be closed through a number of the cells of the battery and the line wires, of a spring for rotating said shaft, mechanism for automatically winding said spring, and devices operating to break the circuit through the unused cells of the battery, substantially as specified.

35. The combination with a battery consisting of a number of cells, a series of contact plates arranged in a circle, said plates being connected successively to successive cells of the battery, a rotatable shaft, and brushes mounted upon said shaft and adapted to bear upon the contact plates to close the circuit through a number of the cells, of a spring for rotating said shaft, an electric motor for winding said spring, and a switch for cutting said motor into or out of circuit, substantially as and for the purpose specified.

36. The combination with a battery consisting of a number of cells, a series of contact plates arranged in a circle, said plates being connected successively to successive cells of the battery, a rotatable shaft, and brushes mounted upon said shaft and adapted to bear upon the contact plates to close the circuit through a number of the cells, of a spring for rotating said shaft, an electric motor for winding said spring, and a switch operated by the rotation of said shaft to cut said motor into or out of circuit substantially as and for the purpose specified.

37. The combination with a battery consisting of a number of cells, a series of contact plates arranged in a circle, said plates being connected successively to successive cells of the battery, a rotatable shaft, and brushes mounted upon said shaft and adapted to bear upon the contact plates to close the circuit through a number of the cells, of a spring 21 for rotating said shaft, gear wheel 61, adapted by its rotation to wind said spring, an electric motor geared to said wheel 61, and devices for automatically controlling the operation of said motor, substantially as and for the purpose specified.

38. The combination with a battery consisting of a number of cells, a series of contact plates arranged in a circle, said plates being connected successively to successive cells of the battery, a rotatable shaft, and brushes mounted upon said shaft and adapted to bear upon the contact plates to close the circuit through a number of the cells, of a spring for rotating said shaft, guide screw 62, wheel 63 adapted to move upon said guide screw and to rotate with said shaft, a slot 64 in the periphery of said wheel, lever 65, having a pin adapted to fit into the slot 64, an electric motor adapted to wind up said spring, and a switch operated by the lever 65 to cut the motor into or out of circuit, substantially as and for the purpose specified.

39. The combination with a battery consisting of a number of cells, a series of contact plates arranged in a circle, said plates being connected successively to successive cells of the battery, a rotatable shaft, and brushes mounted upon said shaft and adapted to bear upon the contact plates to close the circuit through a number of the cells, of a spring for rotating said shaft, guide screw 62, wheel 63 adapted to move upon said guide screw and to rotate with said shaft, a slot 64 in the periphery of said wheel, lever 65, having a pin 67 at one end, adapted to fit into the slot 64, and being forked at its other end, an electric motor adapted to wind up said spring, a switch 68, and a lever 71 connected to said switch, and adapted to fit into the fork in the lever 65, substantially as and for the purpose specified.

40. The combination with a scape wheel, of levers carrying pallets adapted to engage the teeth upon said scape wheel, said teeth being so shaped that the rotation of the scape wheel will cause a reciprocation of the levers, and devices for temporarily holding the pallets alternately in contact with the scape wheel teeth, substantially as and for the purpose specified.

41. The combination with a scape wheel, of levers connected together and carrying pallets adapted to engage the teeth upon said scape wheel, said teeth being so shaped that the rotation of the scape wheel will cause a reciprocation of the levers, and devices for temporarily holding the pallets alternately in contact with the scape wheel teeth, substantially as for the purpose specified.

42. The combination with a scape wheel, of levers connected together and carrying pallets adapted to engage the teeth upon said scape wheel, said teeth being so shaped that the rotation of the scape wheel will cause a reciprocation of the levers, dogs adapted to engage the levers to hold the pallets alternately in contact with the scape wheel teeth, and mechanism for alternately releasing the levers from engagement with said dogs, substantially as and for the purpose specified.

43. The combination with a scape wheel, of levers connected together and carrying pallets adapted to engage the teeth upon said scape wheel, said teeth being so shaped that the rotation of the scape wheel will cause a reciprocation of the levers, dogs adapted to engage the levers to hold the pallets alternately in contact with the scape wheel teeth, and electro magnets adapted to alternately release the levers from engagement with said dogs, substantially as and for the purpose specified.

44. The combination with a shaft, a scape wheel mounted thereon, levers carrying pallets adapted to engage the teeth upon said scape wheel, said teeth being so shaped that the rotation of the scape wheel will cause a reciprocation of the levers, dogs adapted to engage the levers to hold the pallets alternately in contact with the scape wheel teeth, and electro magnets adapted to alternately release the levers from engagement with the dogs, of a commutator mounted upon said shaft, and adapted to direct an electric current through the electro magnets alternately, substantially as and for the purpose specified.

45. The combination with a shaft, a scape wheel 23 mounted thereupon, levers 24 and 25, carrying pallets 26, and a bar 27 connecting the two levers, of bars 30 and 31, dogs 28 and 29 carried thereby, and adapted to engage the ends of said levers, armatures 42 carried by said bars, electro magnets adapted to attract said armatures, and a commutator mounted upon said shaft, adapted to direct a current of electricity through the magnets alternately, substantially as and for the purpose specified.

46. The combination with a battery consisting of a number of cells arranged in groups, the cells in each group being connected together, and line wire poles, of brushes connected to said line wire poles, means for electrically connecting said brushes with the different cells of the battery to cut in a number of the cells and means for connecting the cells of different groups between the brushes, when said brushes are in circuit with the cells of different groups, substantially as described.

47. The combination with a battery consisting of a number of cells arranged in groups, the cells in each group being connected together and line wire poles, of brushes connected to said line wire poles, means for electrically connecting said brushes with the different cells of the battery to cut in a number of the cells, means for connecting the cells of different groups between the brushes when said brushes are in circuit with the cells of different groups, and means for preventing short circuiting of the current through the unused cells, substantially as described.

MILTON M. KOHN.

Witnesses:
JOHN L. JACKSON,
A. H. ADAMS.